US012561231B2

(12) United States Patent
Somawagol et al.

(10) Patent No.: US 12,561,231 B2
(45) Date of Patent: *Feb. 24, 2026

(54) METHOD AND SYSTEM FOR CALCULATION OF NETWORK TEST AUTOMATION FEASIBILITY AND MATURITY INDICES

(71) Applicant: INFOSYS LIMITED, Bangalore (IN)

(72) Inventors: Basavaraj Veerappa Somawagol, Bangalore (IN); Balaji Thangavelu, Bangalore (IN); Sreekanth Sreedevi Sasidharan, Bangalore (IN)

(73) Assignee: Infosys Limited, Bangalore (IN)

( * ) Notice: Subject to any disclaimer, the term of this patent is extended or adjusted under 35 U.S.C. 154(b) by 199 days.

This patent is subject to a terminal disclaimer.

(21) Appl. No.: 18/141,198

(22) Filed: Apr. 28, 2023

(65) Prior Publication Data

US 2024/0330157 A1 Oct. 3, 2024

Related U.S. Application Data

(63) Continuation-in-part of application No. 18/129,265, filed on Mar. 31, 2023.

(30) Foreign Application Priority Data

Mar. 31, 2023 (IN) .............................. 202341024590
Apr. 27, 2023 (IN) ................................. 2023430336

(51) Int. Cl.
*G06F 11/3698* (2025.01)
*G06F 11/3668* (2025.01)

(52) U.S. Cl.
CPC ...... *G06F 11/3676* (2013.01); *G06F 11/3684* (2013.01)

(58) Field of Classification Search
None
See application file for complete search history.

(56) References Cited

U.S. PATENT DOCUMENTS 7,849,115 B2 * 12/2010 Reiner ................... G06Q 30/02
707/912
11,487,878 B1 * 11/2022 Zhang ................... G06F 9/5077
(Continued)

FOREIGN PATENT DOCUMENTS

CN 102368226 A * 3/2012
CN 106021114 A * 10/2016 .......... G06F 11/3688
CN 111125342 A * 5/2020 ........... G06F 16/335

*Primary Examiner* — Philip Wang
(74) *Attorney, Agent, or Firm* — Finnegan, Henderson, Farabow, Garrett & Dunner, LLP

(57) ABSTRACT

This disclosure relates to method and system for calculation of network test automation feasibility and maturity indices. The method includes receiving input data including user responses to a questionnaire associated with a test case. The questionnaire may include a first set of questions associated with a coverage of test case automation, and a second set of questions associated with a usefulness of test case automation. Each question of the questionnaire may include a corresponding weightage. The method further includes computing a coverage of automation index based on the user responses and a first set of weightages corresponding to the first set of questions, and a usefulness of automation index based on the user responses and a second set of weightages corresponding to the second set of questions.

13 Claims, 8 Drawing Sheets

(56)                References Cited

U.S. PATENT DOCUMENTS

| 12,169,871 B1 * | 12/2024 | Reynolds | G06Q 40/02 |
|---|---|---|---|
| 2005/0171831 A1 * | 8/2005 | Johnson | G06Q 10/10 705/7.41 |
| 2008/0115110 A1 * | 5/2008 | Fliek | G06F 11/3672 714/38.14 |
| 2008/0282320 A1 * | 11/2008 | DeNovo | G06F 21/604 726/1 |
| 2010/0229155 A1 * | 9/2010 | Adiyapatham | G06F 11/3672 717/124 |
| 2014/0282433 A1 * | 9/2014 | Eilam | G06F 11/3688 717/124 |
| 2015/0339213 A1 * | 11/2015 | Lee | G06F 3/04842 717/125 |
| 2018/0260307 A1 * | 9/2018 | Varshney | G06F 11/3672 |

\* cited by examiner

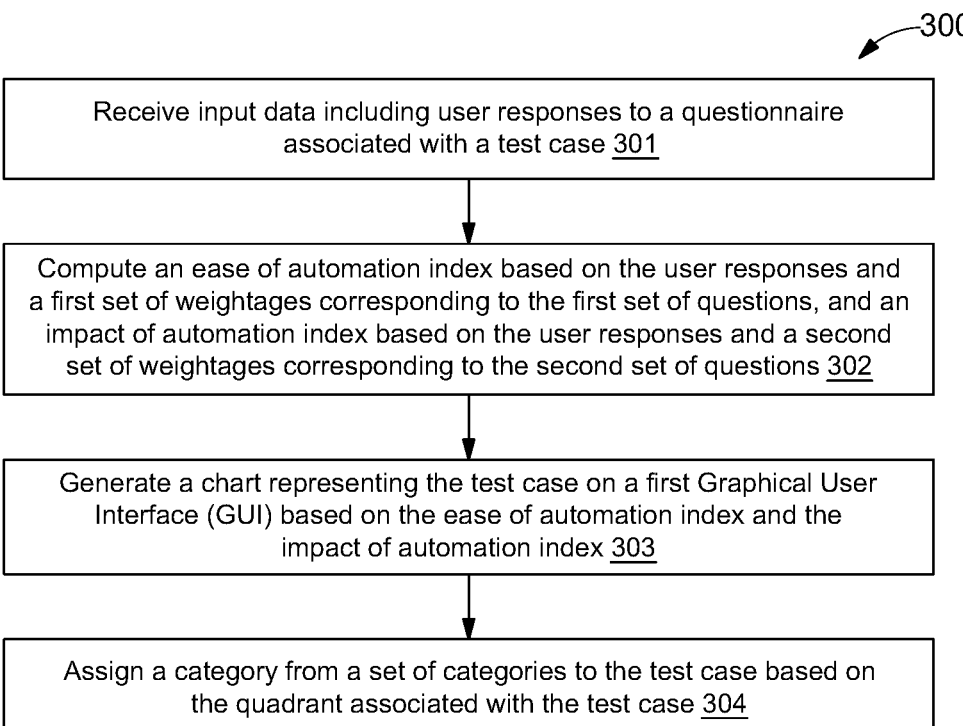

Receive input data including user responses to a questionnaire associated with a test case 301

Compute an ease of automation index based on the user responses and a first set of weightages corresponding to the first set of questions, and an impact of automation index based on the user responses and a second set of weightages corresponding to the second set of questions 302

Generate a chart representing the test case on a first Graphical User Interface (GUI) based on the ease of automation index and the impact of automation index 303

Assign a category from a set of categories to the test case based on the quadrant associated with the test case 304

FIG. 3

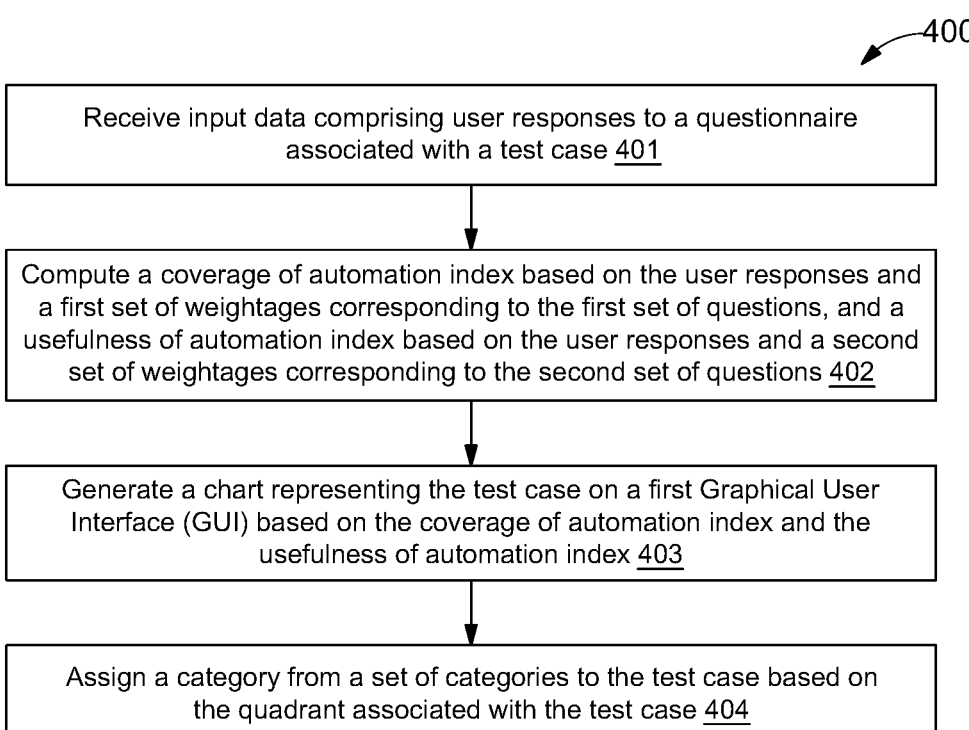

400

Receive input data comprising user responses to a questionnaire associated with a test case 401

Compute a coverage of automation index based on the user responses and a first set of weightages corresponding to the first set of questions, and a usefulness of automation index based on the user responses and a second set of weightages corresponding to the second set of questions 402

Generate a chart representing the test case on a first Graphical User Interface (GUI) based on the coverage of automation index and the usefulness of automation index 403

Assign a category from a set of categories to the test case based on the quadrant associated with the test case 404

FIG. 4

METHOD AND SYSTEM FOR CALCULATION OF NETWORK TEST AUTOMATION FEASIBILITY AND MATURITY INDICES

This application claims the benefit of India Patent Application No. 202343030336, filed on Apr. 27, 2023, and is a Continuation-in-Part of U.S. patent application Ser. No. 18/129,265, filed on Mar. 31, 2023, which claims the benefit of India Patent Application No. 202341024590, filed on Mar. 31, 2023, all of which are herein incorporated by reference.

FIELD

This disclosure relates generally to automation testing, and more particularly to method and system for calculation of network test automation feasibility and maturity indices.

BACKGROUND

Network testing is an integral part of any network software release and rollout-process. It ensures that a developed network application and function executes without errors or failures to provide a smoother experience to users. Previously, network testing was performed manually, with a tester interacting with network functions and applications in accordance with some pre-planned test cases to validate operation of the network function for those test cases.

Over the past few years, many techniques have been developed to automate testing, providing an improved testing speed, thoroughness, and accuracy. As a result, one or more steps of a test case may be currently automated or can potentially be automated. Similarly, one or more test cases of a test suite may be currently or can potentially be automated. Evaluation of current automation levels of a test case or a test suite may facilitate determination of current maturity levels of automation (i.e., how much of a test case or a test suite is currently automated and whether this current automation level is sufficient or there is a scope for further automation).

In some cases, automated testing may require more resources than manual testing. Thus, automated testing may not be feasible for every test case. Additionally, for deciding between automated testing and manual testing, a company may consider a variety of factors, such as resource usage, time taken in testing, number of test cases, ease and impact of automation of each test case, etc. Making such decisions can be critical in improving the efficiency and accuracy of testing process for a network application. The company may need to assess all such factors to arrive at the right decision. Also, testing requirements differ from company to company and from test case to test case. So, there may not be a fixed way to determine whether to implement manual testing or to automate the testing process. When assessed manually for every test case, this might be a time-consuming process. Further, these decisions may be prone to bias or error while assessing the factors.

Therefore, techniques for reliable determination of automation feasibility and maturity of test cases or test suites are required.

SUMMARY

In one embodiment, a method for calculation of test automation maturity indices is disclosed. In one example, the method may include receiving input data comprising user responses to a questionnaire associated with a test case. The questionnaire may include a first set of questions associated with a coverage of test case automation, and a second set of questions associated with a usefulness of test case automation. Each question of the questionnaire may include a corresponding weightage. Further, the method may include computing, by the computing device, a coverage of automation index based on the user responses and a first set of weightages corresponding to the first set of questions, and a usefulness of automation index based on the user responses and a second set of weightages corresponding to the second set of questions.

In one embodiment, a system for calculation of test automation maturity indices is disclosed. In one example, the system may include a processing circuitry and a memory communicatively coupled to the processing circuitry. The memory may store processor-executable instructions, which, on execution, may cause the processing circuitry to receive input data including user responses to a questionnaire associated with a test case. The questionnaire may include a first set of questions associated with a coverage of test case automation, and a second set of questions associated with a usefulness of test case automation. Each question of the questionnaire may include a corresponding weightage. The processor-executable instructions, on execution, may further cause the processing circuitry to compute a coverage of automation index based on the user responses and a first set of weightages corresponding to the first set of questions, and a usefulness of automation index based on the user responses and a second set of weightages corresponding to the second set of questions.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, explain the disclosed principles.

FIG. 3 is a flow diagram of an exemplary process for determination of feasibility of test automation, in accordance with an exemplary embodiment of the present disclosure;

FIG. 4 is a flow diagram of an exemplary process for determination of maturity of test automation, in accordance with an exemplary embodiment of the present disclosure;

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
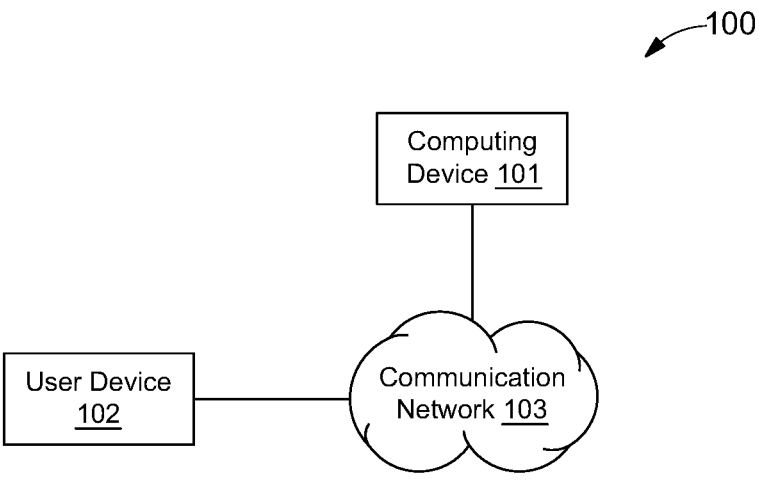
FIG. 1 is a block diagram of an environment for calculation of test automation feasibility indices and test automation maturity indices, in accordance with an exemplary embodiment of the present disclosure.

FIG. 1 is a diagram that illustrates an environment 100 for calculation of test automation feasibility indices and test automation maturity indices, in accordance with an exemplary embodiment of the present disclosure.

The environment 100 may include a computing device 101 and a user device 102 associated with a user. The computing device 101 and the user device 102 are configured to communicate with each other via a communication network 103. Examples of the communication network 103 may include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and a combination thereof.

The user device 102 may provide the input to the computing device 101 through the communication network 103 via a wired connection or a wireless connection, or a combination thereof. The wired connection between the user device 102 and the computing device 101 may include, but is not limited to, B-ISDN, DSL, ADSL, ADSL+2, SDSL, VDSL, and cable. The wireless connection between the user device 102 and the computing device 101 may include, but is not limited to, wireless LAN, wireless MAN, wireless PAN, and wireless WAN.

The user device 102 may be, but is not limited to, a tablet, a smartphone, a laptop, a desktop, a server, or any other computing device. The user device 102 may include one or more input devices, such as a keyboard, a mouse, and the like. Also, the user device 102 may include one or more output devices, such as a digital screen, analog screen, speakers, printer, etc. The user device 102 may receive an input from the user in a computer-readable format such as, but not limited to, a text format, a video format, or an image format. The user device 102 may provide an output to the user in computer-readable formats such as, but not limited to, a text format, a video format, or an image format.

The computing device 101 may be, but is not limited to, a tablet, a smartphone, a laptop, a desktop, a server, or any other computing device. In some embodiments, the computing device 101 may be a centralized server or a group of decentralized servers. The computing device 101 may be configured to manage or execute at least one of a plurality of stages in an application development process.

Elements of the environment 100 may be implemented within an enterprise. The enterprise may be an individual, business, company, or any other organization. The enterprise may include one or more lines of business, subsidiaries, or parent organizations. The enterprise may have already deployed or may be planning to deploy one or more applications (for example, a website, a software product, or a software-based service). The enterprise may require testing of the one or more applications.

In some embodiments, the computing device 101 and the user device 102 may be associated with the enterprise. In some other embodiments, a second enterprise may offer application testing services or products to a first enterprise that has deployed or is planning to deploy the one or more applications. In such embodiments, the computing device 101 may be associated with the second enterprise and the user device 102 may be associated with the first enterprise. Alternately, the computing device 101 may implement an application testing product of the second enterprise but the computing device 101 and the user device 102 may both be associated with the first enterprise.

The user (i.e., any person, end user, a group, or entities that may want to determine test automation feasibility or maturity of a test case or a test suite) may communicate with the computing device 101 through the user device 102. As will be appreciated, "automation feasibility" may correspond to whether a test case is worth automating and "automation maturity" may correspond to whether current automation level of a test case is justified. The automation feasibility or maturity may be determined as a qualitative or a quantitative measure. It should be noted that the user device 102 may be accessed by more than one user. In an embodiment, the user device 102 may be accessed by a plurality of users at different points of time. For example, the plurality of users may be a group of application testers. The group of application testers may want to determine automation feasibility or maturity of one or more test cases. In an embodiment, the user device 102 may be collaboratively accessed by the plurality of users simultaneously through cloud.

As will be appreciated, application testing is a process in application development for validating and verifying working of an application. Application testing is integral to an application development process to identify errors, bugs, risks, or any other issues with the application. It should be noted that the application testing process may not be limited to identifying faults in the application but may also be used to find measures to upgrade the application in terms of efficiency, usability, accuracy, etc. Application testing may be performed on a testing platform.

Generally, an application testing process includes a test plan to be executed. The test plan may document a strategy that will be used to test the application. For example, the strategy may be used to verify and ensure that the application meets certain design specifications, functional requirements, and other requirements, or to verify that the application is error-free. The test plan may be designed by one or more human resources or consultants associated with the enterprise. In a preferred embodiment, the test plan may be designed in accordance with an IEEE standard, such as 829-2008 IEEE Standard for Software and System Test Documentation, 1008-1987 IEEE Standard for Software Unit Testing, 1012-2004 IEEE Standard for Software Verification and Validation, or the like. The test plan may include one or more test suites. A test suite is a group of test cases. The test suite may include detailed instructions or goals for the group of test cases and information on system configuration to be used during testing.

A test case is the most fundamental part of an application testing process. The test case may include a certain set of conditions (or test steps) that need to be checked to test an application or a component thereof. Further, the test case may include an expected output for each of the set of conditions. Upon completing a check of the set of conditions, an actual output from the application for each of the set of conditions may be recorded. Then, the actual output may be compared with the expected output to determine whether the test case provided any errors (i.e., the actual output is different from the expected output), or the test case was successfully completed (i.e., the actual output is same as the expected output). In other words, when a condition of a test case is checked, it checks whether the actual output is same as or at least in alignment with the expected output. A test case may include one or more parameters such as Id, condition, steps, input, expected result, actual result, status, and remarks.

In some embodiments, the test case may be automated by a scripting language, such as, but not limited to, C, C++, Java, Python, Ruby, etc. In some other embodiments, the test case may be manually executed by human testers. Alternately, the test case may include a combination of automated and manual test steps. Manual testing may consume more time to test the test case. The manual testing of test cases may be efficient for small software programs. Automated testing may use a lot of resources but may perform the testing in significantly less time compared to the manual testing. The automatic testing may be efficient for software that may, for example, need frequent testing, or have lengthy source code, or have a huge number of test cases. Thus, it should be noted that automating a test case may not always be feasible. Automation requires availability of computational resources and human resources. Moreover, the manual effort saved by automating a test case may not always provide a favorable return on investment (ROI) with respect to the effort and resources invested for automation.

Additionally, a test case may be wholly or partially automated. In other words, some or all of the test steps of the test case may be automated. Similarly, a test suite may be wholly or partially automated, i.e., some or all of the test cases of the test suite may be automated. Based on current automation levels (i.e., how much of a test case or a test suite is currently automated) and benefits (i.e., impact or usefulness of such automation) of a test case or a test suite, automation maturity of the test case or the test suite may be determined. The automation maturity may be used to determine whether current automation levels of the test case or the test suite are justified given the benefits of such automation.

The enterprise may take a decision between automating or manually executing a test case based on various factors, such as, but not limited to, ease of automation, impact of automation, coverage of automation, and usefulness of automation. The decision may be of importance to the enterprise as it may ensure that the resources are invested where they are needed. In the long term, the decision may prove critical in making the application testing process more efficient and optimized.

The computing device 101 may render a Graphical User Interface (GUI) on a display of the user device 102. The GUI may include a questionnaire associated with a test case. The questionnaire may include a plurality of questions with respect to test case automation. Each of the plurality of questions may include a corresponding weightage. The plurality of questions may be further grouped into one or more sets of questions. The one or more sets of questions may be associated with test automation parameters (e.g., ease of automation, impact of automation, coverage of automation, usefulness of automation, etc.). A test automation parameter may correspond to a test automation index (e.g., ease of automation index, impact of automation index, coverage of automation index, usefulness of automation index, etc.). The plurality of questions may be predefined or generated through a generative Artificial Intelligence (AI) model based on historical data of the test case, or a combination thereof. The historical data may be stored in a database. Additionally, the historical data may be obtained from a test management tool (e.g., JIRA).

In an embodiment, the questionnaire may include a first set of questions associated with an ease of test case automation, and a second set of questions associated with an impact of test case automation. By way of an example, questions corresponding to the ease of test case automation may include, but are not limited to, "scripting language and tools to be used", "skill set of people involved", "availability of resources on time for mentioned skill", "details about the automation feasibility and manual steps", or the like. Questions corresponding to the impact of test case automation may include, but are not limited to, "number of times the test case is used in last 1 year", "priority of test case/feature", "number of times the test case failed", or the like.

In another embodiment, the questionnaire may include a first set of questions associated with a coverage of test case automation, and a second set of questions associated with a usefulness of test case automation. By way of an example, questions corresponding to the coverage of test case automation may include, but are not limited to, "total test cases", "automated test cases, automation percentage", "features automated and planned", "overall and automation team size", "test process automation level", "dedicated automation lab, location (onshore/offshore)", "timeline of current automation", "capital expenditure of current automation (tools/effort/lab)", or the like. Questions corresponding to the usefulness of test case automation may include, but are not limited to, "automation utilization percentage", "lab and tools license utilization percentage", "framework used, features open source/licensed/cost", "test tools used, cost of capex, opex", "test cycle time, reduction in test cycle time after automation", "effort/cost saved", "defects found in automation", "quality/escape defects", or the like.

The user may interact with the GUI and provide user responses to the plurality of questions. The computing device 101 may receive input data including the user responses from the user device 102. The input data may be in the form of audio data, image data, video data, or textual data. Values associated with the user responses may be of one or more data types, such as integer data type, float data type, string data type, array data type, and the like. In an embodiment, the values associated with the user responses may be preprocessed. During the preprocessing, the values may be transformed to a numerical value data type (i.e., one of the integer data type or the float data type) within a common scale (e.g., 0 to 10) based on a set of predefined rules. This is done to normalize the input data for ease of further computation. The set of predefined rules may determine and assign a predefined numerical score to a user response corresponding to a question. For example, for a question, "Which scripting language will be used for automating the test case?", an associated predefined rule may determine a numerical score of '5' if the user response is "Java" and a numerical score of '10' if the user response is "Python". In case a question is generated by the NLP model or the generative AI model, the set of predefined rules may be determined in conjunction with a first Artificial Intelligence (AI) model.

Additionally, each of the plurality of questions may include a corresponding weightage. The weightage may be predefined by the enterprise. Alternately, the weightage may be determined using a second AI model. The weightage may be modified or adjusted by the user. In an embodiment, each of the plurality of questions may have a constant weightage. In an embodiment, the weightage may be dynamically updated by the second AI model based on the historical data of the test case. The historical data may include previous weightages of the questions. The historical data may be stored in a database. Here, the weightage may be updated upon calculating automation feasibility or maturity indices at different time instances. For example, a question A has a weightage w1 at a first time instance of t1. Now, at a second time instance t2 (where t2>t1), weightage of the question A may be changed from w1 to w2. The change may be performed by the user upon evaluating current weightages of the plurality of questions. Or the current weightages may be automatically updated using the second AI model based on the historical data corresponding to the plurality of questions and the associated current weightages.

Further, the computing device 101 may calculate the test automation feasibility indices (such as an ease of automation index and an impact of automation index) or the test automation maturity indices (such as a coverage of automation index and a usefulness of automation index) of the test case based on the weightages and the numerical scores of the respective sets of questions. The computing device 101 may render the test automation feasibility indices or the automation maturity indices on the GUI of the user device 102. In an embodiment, the computing device 101 may represent the test automation feasibility indices or the automation maturity indices on a chart (for example a scatter plot, a line chart, a bar chart, a histogram, a pie chart, or the like) in the GUI.

In an embodiment, the calculated test automation feasibility indices may be the ease of automation index and the impact of automation index, and the chart may be a scatter plot. The chart may include a first axis (e.g., x-axis) representing values of the ease of automation index and a second axis (e.g., y-axis) representing the values of the impact of automation index. The chart may include four quadrants formed by extending a perpendicular line from a mid-point of the common scale of each of the first axis and the second axis. The test case may be represented in a quadrant of the four quadrants. Further, the computing device 101 may assign a category from a set of categories to the test case based on the quadrant associated with the test case. Each of the set of categories corresponds to an automation feasibility label. By way of an example, the set of categories may include, but is not limited to, "high ease, high impact", "low ease, high impact", "high ease, low impact", and "low ease, low impact". Each category may include an associated category weightage. Points corresponding to test cases in each category (i.e., each quadrant) may be represented by a different color.

Similarly, the calculated test automation maturity indices may be the coverage of automation index and the usefulness of automation index, and the chart may be a scatter plot. The chart may be similar to the chart described above. The computing device 101 may assign a category from a set of categories to the test case based on the quadrant of the chart associated with the test case. Each of the set of categories corresponds to an automation maturity label. By way of an example, the set of categories may include, but is not limited to, "high coverage, high usefulness", "low coverage, high usefulness", "high coverage, low usefulness", and "low coverage, low usefulness". Each category may include an associated category weightage. Points corresponding to test cases in each category (i.e., each quadrant) may be represented by a different color.

In another embodiment, the computing device 101 may represent the test automation feasibility indices or the automation maturity indices in form of a table in the GUI. The table may include columns corresponding to the test automation feasibility indices or the automation maturity indices, and the associated values of the test automation feasibility indices or the automation maturity indices. The table may also represent the plurality of questions and the corresponding weightages. The computing device 101 may also provide a category associated with each test case. Here, the category may be determined directly through the test automation feasibility indices or the automation maturity indices. In other words, a calculated test automation index may be compared with a predefined threshold test automation index and the category may be determined based on the comparison.

Further, the computing device 101 may determine a target automation percentage of the test case based on the calculated test automation feasibility indices. The computing device 101 may determine the feasibility of automating the test case (i.e., whether automating the test case will be favorable with respect to enterprise requirements (e.g., financial requirements)) based on the calculated test automation feasibility indices. Further, the computing device 101 may render a recommendation corresponding to automation of the test case based on the calculated automation indices. The recommendation may be provided through a third AI model (such as, an NLP model or a Large Language Model (LLM)).

Alternately or additionally, the computing device 101 may determine an automation maturity percentage of the test case based on the calculated test automation maturity indices. The computing device 101 may determine the maturity of current automation levels of the test case (i.e., whether the benefits of automating the test case are being adequately realized with respect to enterprise goals (e.g., operational goals)) based on the calculated test automation maturity indices. Further, the computing device 101 may render a recommendation corresponding to automation of the test case and a review of current automation of the test case based on the calculated automation indices. The recommendation may be provided through a third AI model (such as, an NLP model or a generative AI model (e.g., a Large Language Model (LLM))).

Figure 2:
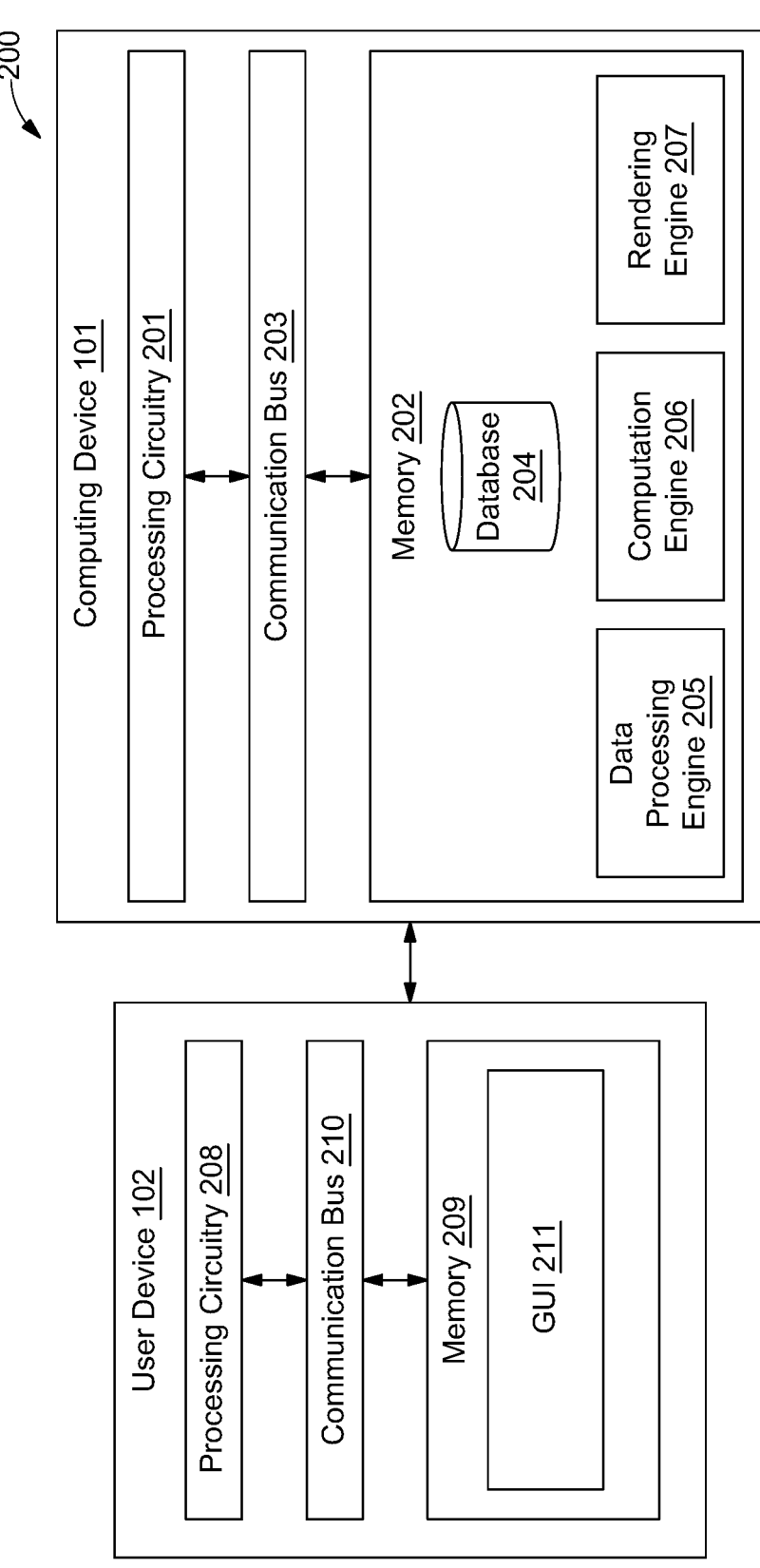
FIG. 2 is a block diagram of a system for determination of feasibility and maturity of test automation, in accordance with an exemplary embodiment of the present disclosure.

FIG. 2 is a block diagram that illustrates a system 200 for determination of feasibility and maturity of test automation, in accordance with an exemplary embodiment of the present disclosure. FIG. 2 is explained in conjunction with elements from FIG. 1. The system 200 may include the computing device 101 and the user device 102. In an embodiment, the computing device 101 may include a processing circuitry 201 and a memory 202 communicatively coupled to the processing circuitry 201 via a communication bus 203. The memory 202 may store processor instructions. The processor instructions, when executed by the processing circuitry 201, may cause the processing circuitry 201 to implement one or more embodiments of the present disclosure such as, but not limited to, calculating test automation feasibility or maturity indices of a test case, generating a graph based on the calculated test automation feasibility or maturity indices, and determining a target automation percentage and automation maturity percentage based on the calculated test automation feasibility indices and test automation maturity indices, respectively. Further, the memory 202 of the computing device 101 may include a database 204, a data processing engine 205, a computation engine 206, and a rendering engine 207.

Further, the user device 102 of the system 200 may include a processing circuitry 208 and a memory 209 communicatively coupled to the processing circuitry 208 via a communication bus 210. Further, the memory 209 of the user device 102 may store processor instructions. The processor instructions, when executed by the processing circuitry 208, may cause the processing circuitry 208 to implement one or more embodiments of the present disclosure such as, but not limited to, presenting a questionnaire to the user through a GUI, receiving user responses corresponding to the questionnaire, and rendering a chart on the GUI. The memory 209 may include a GUI 211.

In an embodiment, the database 204 of the computing device 101 may include an organized collection of structured information, or data, typically stored electronically in the memory 202. The database 204 may be controlled by a database management system (DBMS). It should be noted that the database may include the plurality of questions of the questionnaire, historical values corresponding to the questionnaire and the user responses, corresponding weightages, calculated test automation feasibility and maturity indices, and the like. For illustrative purposes, the user device 102 is shown to include the GUI 211. However, the GUI 211 may correspond to any of the different GUIs rendered to the user device 102 by the computing device 101.

Further, the data processing engine 205 may select the plurality of questions from the database 204 for the questionnaire based on the test case. The database 204 may include one or more sets of predefined questions. Further, the rendering engine 207 may prompt the selected questions to the user through the GUI 211. The data processing engine 205 may select questions to be prompted to the user in such a way that only questions relevant to the test case are prompted. In an embodiment, each of the set of predefined questions may be stored in the database 204 by the user. In an embodiment, the one or more sets of predefined questions may not be modified, or the user may not be able to add the additional questions to the database 204. In another embodiment, new questions can be added by the user to the database 204, and the one or more sets of predefined questions may be modified by the user.

The plurality of questions may be predefined or generated through an NLP model or a generative AI model based on historical data of the test case, or a combination thereof. The historical data may be stored in a database. The historical data may be obtained from a test management tool (e.g., JIRA).

In an embodiment, the database 204 may include one or more sets of questions associated with test automation parameters (e.g., ease of automation, impact of automation, coverage of automation, usefulness of automation, etc.). A test automation parameter may correspond to a test automation index (e.g., ease of automation index, impact of automation index, coverage of automation index, usefulness of automation index, etc.). For example, the database 204 may include a first set of questions corresponding to the ease of test case automation and a second set of questions corresponding to the impact of test case automation. Alternately, the first set of questions may correspond to the coverage of test case automation and the second set of questions may correspond to the usefulness of test case automation.

Further, the rendering engine 207 may present the plurality of questions on the GUI 211. The user may provide user responses corresponding to the plurality of questions. The plurality of questions may be presented as multiple choice questions (with predefined options presented as check boxes or a drop-down menu) or a direct response question (e.g., as text boxes, image upload boxes, etc.). The user responses may be in the form of audio data, image data, video data, or textual data.

Values associated with the user responses may be of one or more data types, such as integer data type, float data type, string data type, array data type, and the like. In an embodiment, the data processing engine 205 may preprocess the values associated with the user responses. During the preprocessing, the data processing engine 205 may transform the values to a numerical value data type (i.e., one of the integer data type or the float data type) within a common scale (e.g., 0 to 10) based on a set of predefined rules. This is done to normalize the input data for ease of further computation.

Based on the set of predefined rules, the data processing engine 205 may determine and assign a predefined numerical score to a user response corresponding to a question. For example, for a question, "Which scripting language will be used for automating the test case?", an associated predefined rule may determine a numerical score of '5' if the user response is "Java" and a numerical score of '10' if the user response is "Python". In case a question is generated by the NLP model or the generative AI model, the set of predefined rules may be determined in conjunction with the first AI model (for example, same or different generative AI model).

In an embodiment, the user may provide the user responses in form of a natural language text and the data processing engine 205 may process the user responses through the third AI model (e.g., GPT-4, LAMDA, etc.). Further, the processed user responses may then be transformed into numerical scores based on the set of predefined rules as explained above.

It should be noted that the plurality of questions may include corresponding weightages. The weightages may be predefined or calculated by the computation engine 206 using the second AI model (for example, a Recurrent Neural Network (RNN), a Fast-RNN, or the like). The computation engine 206 may modify or adjust the weightage based on a user command. In an embodiment, each of the plurality of questions may have a constant weightage. In an embodiment, the computation engine 206 may dynamically update the weightage using the second AI model based on the historical data of the test case.

The historical data may include previous weightages of the questions. The historical data may be stored in the database 204. Here, the computation engine 206 may update the weightage upon calculating automation feasibility indices at different time instances. For example, a question A has a weightage $w1$ at a first time instance of $t1$. Now, at a second time instance $t2$ (where $t2>t1$), weightage of the question A may be changed from $w1$ to $w2$. The change may be performed by the user upon evaluating current weightages of the plurality of questions. Or the computation engine 206 may automatically update the current weightages using the second AI model based on the historical data corresponding to the plurality of questions and the associated current weightages.

Further, the plurality of questions may include independent questions and dependent questions. The independent questions may be primary questions and not depending upon user responses to other questions. The dependent questions may be dependent upon the user response to independent questions. The computation engine 206 may assign a weightage to each of the plurality of questions in the questionnaire in such a way that more relevant questions may be assigned higher weightages. In other words, independent questions may be assigned more weightage than the dependent questions. For example, a question, "scripting language and tool used to automate the test case" may have a higher weightage than a question, "capital required to automate a test case". This is because the user response corresponding to the question "capital required to automate a test case" is dependent on the user response corresponding to the question "scripting language and tool used to automate the test case". Thus, the question "scripting language and tool used to automate the test case" may be more relevant (and independent) and may have more weightage in determining whether to automate the test case.

By way of an example, a first user may provide the user response to the question "scripting language and tool used to automate the test case" as "Python" and the user response to the question "capital required to automate a test case" as "1000". Now, a second user may provide the user response to the question "scripting language and tool used to automate the test case" as "C++" and the user response to the question "capital required to automate a test case" as "2000".

Further, the rendering engine 207 may render the questionnaire and the corresponding user responses on the GUI 211 of the user device 102. The GUI 211 may enable the user to visualize or read the questionnaire generated by the data processing engine 205. Further, the GUI 211 may be an interactive User Interface that may enable the user to provide input data through various input devices including, but not limited to, a keyboard, a virtual keyboard, a voice command input, or a gesture, as an input.

Further, the data processing engine 205 of the computing device 101 may receive the input data provided by the user corresponding to the questionnaire. The data processing engine 205 may transform the received input data into numerical values on a common scale (e.g., 0 to 10). The transformation of the input data corresponding to the questionnaire may be based on a set of predefined rules. The set of predefined rules may associate a numerical score with each of the user responses. In an embodiment, the set of predefined rules may be dependent on relevancy of the question. In continuation of the example above, the question "scripting language and tool used to automate the test case" may have finite options for a user response. So, the numerical value corresponding to the user response of this question may be predefined such as, for user response, "Python", the numerical value may be predefined as "4".

In an embodiment, for the questions that may not have finite options for the user response, the numerical value may not be predefined. The data processing engine 205 may transform the user response to the common scale by using techniques such as normalization. By way of an example, the question "capital required to automate a test case" may not have finite input options as different test cases may require different capital to execute and the user response may not be predefined but may fall within a range. Thus, the data processing engine 205 may normalize user responses for such questions.

In some embodiments, the data processing engine 205 may associate different ranges of the user responses corresponding to the question with a numerical value within the common scale. For example, the user response within a range of 100-1000 may be associated with a numerical value of 10, within a range of 1000-2000 numerical value of 9 may be assigned, and so on. Now, if the user response is provided as "800", the data processing engine 205 may transform the user response to "10". It should be noted that the categorization of the user response into the ranges may only be possible if a lower limit and an upper limit of the user response is defined.

Further, upon transforming the user response corresponding to the questionnaire to the numerical value on the common scale by the data processing engine 205, the computation engine 206 may receive each of the numerical values of the user responses. Further, for a set of questions corresponding to a test automation index, the computation engine 206 may compute the test automation index based on the numerical values of the user responses and the weightages corresponding to the set of questions.

For example, the plurality of questions may include a first set of questions associated with an ease of test case automation, and a second set of questions associated with an impact of test case automation. The computation engine 206 may compute an ease of automation index based on the numerical values of the user responses corresponding to the first set of questions (i.e., an ease of automation questionnaire). Similarly, the computation engine 206 may compute an impact of automation index based on the numerical values of the user responses corresponding to the second set of questions (i.e., an impact of automation questionnaire). The ease of automation index and the impact of automation index may be numerical values within the common scale (e.g., 0 to 10) or shown as percentages.

The ease of automation of a test case may be defined in layman's term as "how easy a test case is to automate". By way of an example, a scripting language may be used to automate a test case but, the scripting language may be selected from a plurality of programming languages that may be used to automate the test case. Thus, the ease of test case automation may be determined based on which programming language is used to script the automation of the test case. For example, if the programming language used is python, then automating the test case may be relatively easy in comparison to when the programming language used is C++. However, the numerical score of such user responses may depend on enterprise requirements and enterprise capabilities. For example, if an enterprise has more human resources who are proficient in C++, then for ease of automation, C++ may be assigned a higher numerical score. In an embodiment, the ease of automation of the test case may be defined as quantitative index of automation of test case.

In some embodiments, the ease of automation index may be calculated by determining a weighted average of the user responses (numerical values) to the first set of questions (i.e., the ease of automation questionnaire). In an exemplary scenario, the first set of questions includes three questions corresponding to the ease of the automation, such as "Q1", "Q2", and "Q3" assigned a weightage of "30%", "20%" and "50%", respectively. The transformed numerical values of the user responses corresponding to the "Q1", "Q2", and "Q3" may be "4", "6", and "2", respectively. Thus, the computation engine 206 may determine the ease of automation index as "3.2" based on the weightage of each of the first set of questions.

The impact of automation of a test case may be defined in layman's term as "what will be the impact of automating the test case". By way of an example, a test case may be executed by manual testing or automated testing. Thus, the impact of automation of the test case may be determined based on which way of testing the test case may significantly reduce the time and resources consumed in executing the test case. In an embodiment, the impact of automation of the test case may be defined as qualitative index of automation of test case.

In some embodiments, the impact of automation index may be calculated by determining a weighted average of the user responses (numerical values) to the second set of questions (i.e., the impact of automation questionnaire). In an exemplary scenario, the second set of questions includes four questions corresponding to the impact of the automation, such as "Q1", "Q2", "Q3", and "Q4" assigned a weightage of "30%", "20%" and "10%", and "40%", respectively. The transformed numerical values of the user responses corresponding to the "Q1", "Q2", "Q3", and "Q4" may be "4", "6", and "8", and "2", respectively. Thus, the computation engine 206 may determine the impact of automation index as "4" based on the weightage of each of the second set of questions.

In another example, the plurality of questions may include a first set of questions associated with a coverage of test case automation, and a second set of questions associated with a usefulness of test case automation. The computation engine 206 may compute a coverage of automation index based on the numerical values of the user responses corresponding to the first set of questions (i.e., a coverage of automation questionnaire). Similarly, the computation engine 206 may compute a usefulness of automation index based on the numerical values of the user responses corresponding to the second set of questions (i.e., a usefulness of automation questionnaire). The coverage of automation index and the usefulness of automation index may be numerical values within the common scale (e.g., 0 to 10) or shown as percentages.

The coverage of automation of a test case may be defined in layman's term as "how much of a test case is currently automated". By way of an example, a first test case may include a plurality of test steps (say, 10 test steps). Out of these, 5 test steps are performed manually and 5 test steps are automated. A second test case (also including 10 test steps may have 4 manually performed test steps and 6 automated test steps. Thus, it can be said that the second test case has a greater coverage of automation compared to the first test case. However, it should be noted this is a simplistic explanation of the concept of coverage of automation. The actual calculation of the coverage of automation of test case, as described in the present disclosure, is more complex. For example, the 5 automated test steps of the first test case may be more critical to the process than the 6 automated test steps of the second test case. In an embodiment, the coverage of automation of the test case may be defined as quantitative index of automation of test case.

In some embodiments, the coverage of automation index may be calculated by determining a weighted average of the user responses (numerical values) to the first set of questions (i.e., the coverage of automation questionnaire). In an exemplary scenario, the first set of questions includes three questions corresponding to the coverage of the automation, such as "Q1", "Q2", and "Q3" assigned a weightage of "30%", "20%" and "50%", respectively. The transformed numerical values of the user responses corresponding to the "Q1", "Q2", and "Q3" may be "4", "6", and "2", respectively. Thus, the computation engine 206 may determine the computation of automation index as "3.2" based on the weightage of each of the first set of questions.

The usefulness of automation of a test case may be defined in layman's term as "what are the benefits or advantages of current automation level of the test case". The usefulness of automation of the test case may be determined based on how advantageous the present automation level of a test case is. For example, current automation level of the test case may be significantly reducing the time and resources consumed in executing the test case, indicating a high usefulness of automation of the test case. In an embodiment, the usefulness of automation of the test case may be defined as qualitative index of automation of test case.

In some embodiments, the usefulness of automation index may be calculated by determining a weighted average of the user responses (numerical values) to the second set of questions (i.e., the usefulness of automation questionnaire). In an exemplary scenario, the second set of questions includes four questions corresponding to the usefulness of the automation, such as "Q1", "Q2", "Q3", and "Q4" assigned a weightage of "30%", "20%" and "10%", and "40%", respectively. The transformed numerical values of the user responses corresponding to the "Q1", "Q2", "Q3", and "Q4" may be "4", "6", and "8", and "2", respectively. Thus, the computation engine 206 may determine the usefulness of automation index as "4" based on the weightage of each of the second set of questions.

It should be noted that the above-mentioned examples are described using a single test case. However, as will be appreciated by those skilled in the art, such methods are applicable to test suites (i.e., a plurality of test cases) in a similar manner. The computing engine 206 may compute the test automation indices corresponding to a test suite by obtaining user responses corresponding to the test suite. For example, the coverage of automation index may indicate a proportion of test suite that is currently automated (i.e., how many of the plurality of test cases are currently automated and out of those, how many test steps in such test cases are currently automated).

Further, the rendering engine 207 may receive the ease of automation index and the impact of automation index from the computation engine 206. The rendering engine 207 may generate a visual representation (for example, a graph, a table, etc.) based on at least one of the ease of automation index or the impact automation index. It should be noted that the ease of automation index and the impact automation index are explained in detail, but the present disclosure is not limited to the two explained test automation feasibility indices. In some embodiments, the computation engine 206 may compute additional test automation feasibility indices. In such embodiments, the visual representation may include the additional test automation feasibility indices.

Additionally, the rendering engine 207 may receive the coverage of automation index and the usefulness of automation index from the computation engine 206. The visual representation generated in this case may be based on at least one of the coverage of automation index or the usefulness of automation index.

By way of an example, the visual representation rendered on the GUI 211 of the user device 102 may be a scatter plot. The rendering engine 207 may generate the scatter plot by plotting the ease of automation index values or the coverage of automation index values on the x-axis and the impact of automation index values or the usefulness of automation index values on the y-axis. Alternately, the ease of automation index values or the coverage of automation index values may be represented on the y-axis and the impact of automation index values or the usefulness of automation index values may be represented on the x-axis.

The chart rendered on the GUI 211 may be generated on a 2-Dimensional graph which may include an x-axis and a y-axis. The x-axis and y-axis of the chart may have a scale of 10 points such as 0 to 10. As discussed earlier, the x-axis may denote the ease of automation or the coverage of automation of the test case and y-axis may denote the impact of automation or the usefulness of automation of the test case. In an embodiment, the chart may be divided into four quadrants by extending perpendicular lines from the midpoints of the x-axis and y-axis of the chart. The four quadrants formed may denote the current or projected ROI on automating a test case. For example, the first quadrant of a first scatter plot may correspond to high ease of automation index values and impact of automation index values. Therefore, if a test case (represented as a point on the scatter plot) falls in the first quadrant (i.e., high ease and high impact of automation), automating the test case may correspond to a high projected ROI for the enterprise. Similarly, the first quadrant of a second scatter plot may correspond to high coverage of automation index values and usefulness of automation index values. Therefore, if a test case (represented as a point on the scatter plot) falls in the first quadrant (i.e., high coverage and high usefulness of automation), automating the test case may correspond to a high current ROI for the enterprise. Further, the points falling in each quadrants may be color coded to better visualize the chart. This has been explained in detail in conjunction with FIGS. 7 and 8.

In an embodiment, the rendering engine 207 may generate a plurality of visual representations of the ease of automation index or the coverage of automation index and the impact of automation index or the usefulness of automation index on the GUI 211. The plurality of visual representations may include, but are not limited to, a scatter plot, a histogram, a line chart, a pie chart, table, etc. The rendering engine 207 may also provide an expected ROI or a current ROI of automating a test case to the GUI 211. By way of an example, a high ease of automation index of the test case and a high impact of automation index of the test case may indicate a high expected ROI on automating the test case. Similarly, a high coverage of automation index of the test case and a high usefulness of automation index of the test case may indicate a high current ROI on automating the test case.

The computation engine 206 may determine a target automation percentage of a test case based on the calculated test automation feasibility indices (i.e., the ease of automation index and the impact of automation index). Similarly, the computation engine 206 may determine an automation maturity percentage of a test case based on the calculated test automation maturity indices (i.e., the coverage of automation index and the usefulness of automation index). It should be noted that functioning of the system 200 has been explained in terms of a single test case, but the system 200 is not limited to just a single test case. In a preferred embodiment, the system 200 may calculate test automation feasibility indices of one or more test cases within a test suite and may also extend to calculate test automation feasibility indices of more than one test suite (i.e., test plans). In some embodiments, the computation engine 206 may determine a target automation percentage of one or more test cases in a test suite based on the ease of automation index and the impact of automation index.

In some embodiments, the computation engine 206 may generate a recommendation corresponding to automation of the test case based on the ease of automation index or the coverage of automation index and the impact of automation index or the usefulness of automation index. Also, the rendering engine 207 may render a review of current automation of the test case based on the coverage of automation index and the usefulness of automation index. The rendering engine 207 may then render the recommendation and/or the review on the GUI 211.

It should be noted that all such aforementioned engines 204-207 may be represented as a single module or a combination of different modules. Further, as will be appreciated by those skilled in the art, each of the engines 204-207 may reside, in whole or in parts, on one device or multiple devices in communication with each other. In some embodiments, each of the engines 204-207 may be implemented as dedicated hardware circuit comprising custom application-specific integrated circuit (ASIC) or gate arrays, off-the-shelf semiconductors such as logic chips, transistors, or other discrete components. Each of the engines 204-207 may also be implemented in a programmable hardware device such as a field programmable gate array (FPGA), programmable array logic, programmable logic device, and so forth. Alternatively, each of the engines 204-207 may be implemented in software for execution by various types of processors (e.g., the processing circuitry 201). An identified module of executable code may, for instance, include one or more physical or logical blocks of computer instructions, which may, for instance, be organized as an object, procedure, function, or other construct. Nevertheless, the executables of an identified module or component need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for determination of feasibility and maturity of network test automation. For example, the exemplary computing device 101 may determine feasibility of automating a test case by the processes discussed herein. In particular, as will be appreciated by those of ordinary skill in the art, control logic and/or automated routines for performing the techniques and steps described herein may be implemented by the computing device 101 either by hardware, software, or combinations of hardware and software. For example, suitable code may be accessed and executed by the one or more processors on the computing device 101 to perform some or all of the techniques described herein. Similarly, application specific integrated circuits (ASICs) configured to perform some, or all of the processes described herein may be included in the one or more processors on the computing device 101.

FIG. 3 is a diagram that illustrates an exemplary process 300 for calculation of test automation feasibility indices, in accordance with an exemplary embodiment of the present disclosure. FIG. 3 is explained in conjunction with elements from FIGS. 1 and 2. In an embodiment, the process 300 may be implemented by the computing device 101. The process 300 may include receiving, by the data processing engine 205, input data including user responses to a questionnaire associated with a test case, at step 301. The questionnaire may include a first set of questions associated with an ease of test case automation, and a second set of questions associated with an impact of test case automation. Each question of the questionnaire may include a corresponding weightage. The questions of the questionnaire may be retrieved from a database (such as the database 204). Further, the process 300 may include transforming, by the data processing engine 205, each of the user responses into a numerical value within a common scale based on a set of predefined rules.

Further, the process 300 may include computing, by the computation engine 206, an ease of automation index based on the user responses and a first set of weightages corresponding to the first set of questions, and an impact of automation index based on the user responses and a second set of weightages corresponding to the second set of questions, at step 302.

Further, the process 300 may include generating, by the rendering engine 207, a chart representing the test case on a first GUI based on the ease of automation index and the impact of automation index, at step 303. The chart may include a first axis representing values of the ease of automation index and a second axis representing the values of the impact of automation index. In an embodiment, the first axis may be an x-axis and the second axis may be a y-axis. The chart may include four quadrants formed by extending a perpendicular line from a mid-point of the common scale of each of the first axis and the second axis. The test case may be represented in a quadrant of the four quadrants.

Further, the process 300 may include assigning, by the computation engine, a category from a set of categories to the test case based on the quadrant associated with the test case, at step 304. Each of the set of categories corresponds to an automation feasibility label (such as "high ease, high impact", "low ease, high impact", "high ease, low impact", and "low ease, low impact").

Further, the process 300 may include rendering, by the rendering engine 207 and through a second GUI, a recommendation corresponding to automation of the test case based on the ease of automation index and the impact of automation index. The recommendation may be determined by the third AI model. Additionally, in some embodiments, the process 300 may include determining, by the computation engine, a target automation percentage of the test case based on the ease of automation index and the impact of automation index.

FIG. 4 is a diagram that illustrates an exemplary process 400 for calculation of test automation maturity indices, in accordance with an exemplary embodiment of the present disclosure. FIG. 4 is explained in conjunction with elements from FIGS. 1, 2, and 3. In an embodiment, the process 400 may be implemented by the computing device 101. The process 400 may include receiving, by the data processing engine 205, input data including user responses to a questionnaire associated with a test case, at step 301. The questionnaire may include a first set of questions associated with a coverage of test case automation, and a second set of questions associated with a usefulness of test case automation. Each question of the questionnaire may include a corresponding weightage. The questions of the questionnaire may be retrieved from a database (such as the database 204). Further, the process 400 may include transforming, by the data processing engine 205, each of the user responses into a numerical value within a common scale based on a set of predefined rules.

Further, the process 400 may include computing, by the computation engine 206, a coverage of automation index based on the user responses and a first set of weightages corresponding to the first set of questions, and a usefulness of automation index based on the user responses and a second set of weightages corresponding to the second set of questions, at step 402.

Further, the process 400 may include generating, by the rendering engine 207, a chart representing the test case on a first GUI based on the coverage of automation index and the usefulness of automation index, at step 403. The chart may include a first axis representing values of the coverage of automation index and a second axis representing the values of the usefulness of automation index. In an embodiment, the first axis may be an x-axis and the second axis may be a y-axis. The chart may include four quadrants formed by extending a perpendicular line from a mid-point of the common scale of each of the first axis and the second axis. The test case may be represented in a quadrant of the four quadrants.

Further, the process 400 may include assigning, by the computation engine 206, a category from a set of categories to the test case based on the quadrant associated with the test case, at step 404. Each of the set of categories corresponds to an automation maturity label (such as "high coverage, high usefulness", "low coverage, high usefulness", "high coverage, low usefulness", and "low coverage, low usefulness").

Further, the process 400 may include rendering, by the rendering engine 207 and through a second GUI, a recommendation corresponding to automation of the test case based on the coverage of automation index and the usefulness of automation index. The recommendation may be determined by the third AI model. Additionally, in some embodiments, the process 400 may include determining, by the computation engine 206, an automation maturity percentage of the test case based on the coverage of automation index and the usefulness of automation index. In some embodiments, the process 400 may include rendering, by the rendering engine 207 and through a third GUI, a review of current automation of the test case based on the coverage of automation index and the usefulness of automation index.

Figure 5:
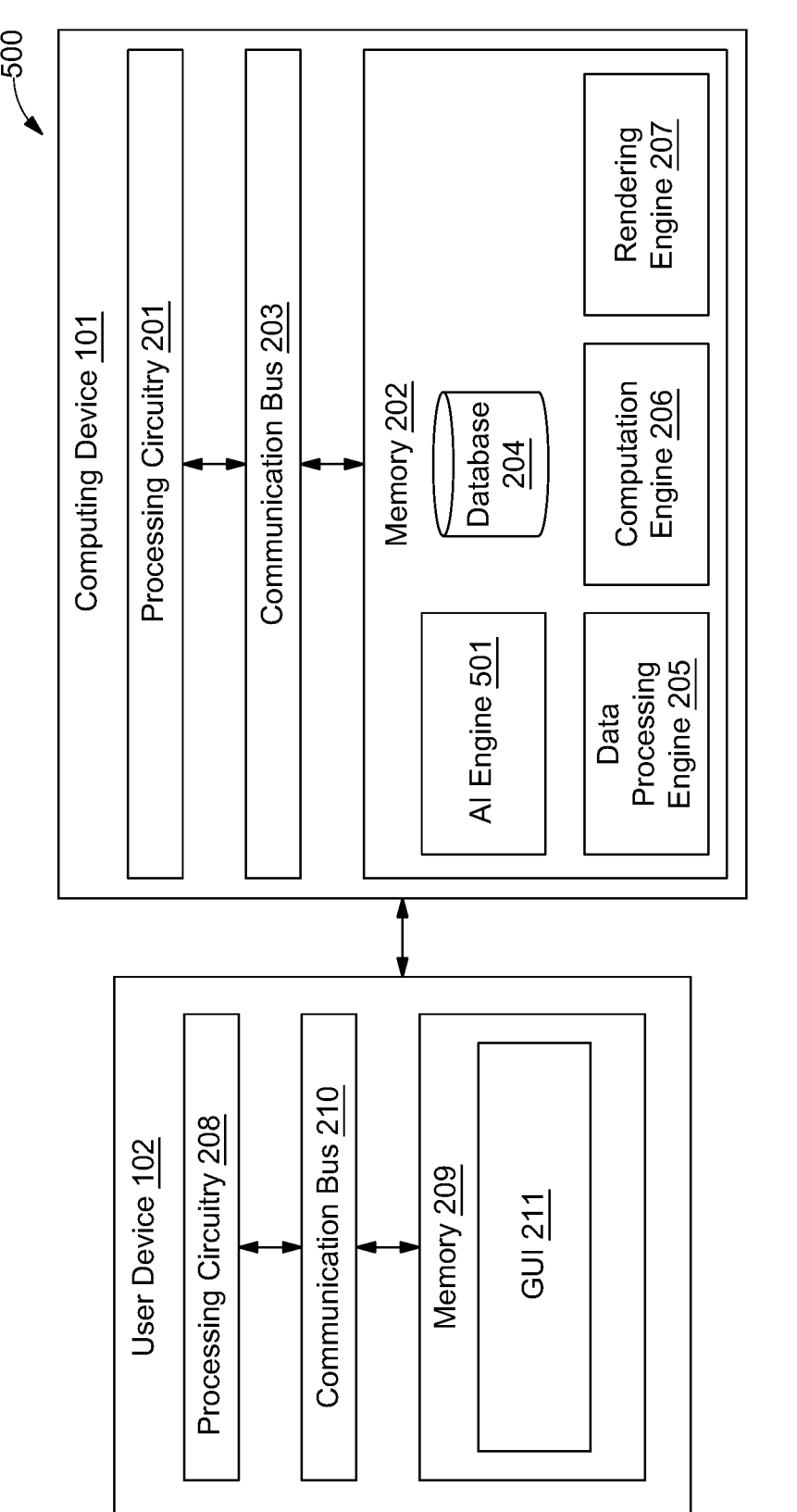
FIG. 5 is a block diagram of a system for determination of feasibility and maturity of test automation, in accordance with an exemplary embodiment of the present disclosure.

FIG. 5 is a block diagram that illustrates an exemplary system 400 for determination of feasibility and maturity of test automation, in accordance with an exemplary embodiment of the present disclosure. FIG. 5 is explained in conjunction with elements from FIGS. 1, 2, 3, and 4. The system 500 may include the computing device 101 and the user device 102. In an embodiment, the computing device 101 may include the processing circuitry 201 and the memory 202 communicatively coupled to the processing circuitry 201 via the communication bus 203. The memory 202 may store processor instructions. The processor instructions, when executed by the processing circuitry 201, may cause the processing circuitry 201 to implement one or more embodiments of the present disclosure. Further, the memory 202 of the computing device 101 may include the database 204, the data processing engine 205, the computation engine 206, the rendering engine 207, and an AI engine 501.

Further, the user device 102 of the system 500 may include a processing circuitry 208 and a memory 209 communicatively coupled to the processing circuitry 208 via a communication bus 210. The memory 209 may include the GUI 211. It should be noted that the engines 204-207 may function in a similar manner as explained in conjunction with FIG. 2.

In an embodiment, the AI engine 501 may include an NLP model or a generative AI model, and one or more AI models. The NLP model or the generative AI model may be configured to generate one or more questions of the questionnaire based on historical data retrieved from the database 204. In an embodiment, the NLP model or the generative AI model may generate the entire questionnaire. Alternately, some questions of the questions may be predefined and the remaining questions may be generated by the NLP model or the generative AI model. The NLP model or the generative AI model may be trained with a training dataset and the historical data of one or more test cases. The training dataset may include, for example, an expected outcome and an actual outcome for each of one or more test steps in a test case. The historical data may include historic test case data, test case statistics pulled from a test management tool (such as, JIRA), etc. Additionally, the NLP model or the generative AI model may make use of additional data to generate the questions. The additional data may include, for example, enterprise data (e.g., availability of human resources, skill level of human resources, infrastructure of the enterprise, etc.), client data, or the like.

For each of the one or more test cases, the NLP model or the generative AI model may then generate one or more sets of questions. For example, the NLP model or the generative AI model may generate a first set of questions associated with an ease or a coverage of test case automation, and a second set of questions associated with an impact or a usefulness of test case automation. Further, the NLP or generative AI-generated questions along with predefined questions (if any) may be rendered to the GUI 211. The user may then interact with the GUI 211 and provide user responses corresponding to the rendered questions through the GUI 211.

It should be noted that the first set of questions and the second set of questions may have different number of questions, or may have same number of questions. The first set of questions and the second set of questions may contain any number of questions as long as the questions are relevant to the test case automation. Further, the rendered questions may be subjective or objective. The subjective set of questions may receive a user response in text, voice, video, or image inputs. The objective set of questions may receive the user response as one of multiple options.

In some embodiments, based on the set of predefined rules, the data processing engine 205 may determine and assign a predefined numerical score to a user response corresponding to a question. For example, for a question, "Which scripting language will be used for automating the test case?", an associated predefined rule may determine a numerical score of '5' if the user response is "Java" and a numerical score of '10' if the user response is "Python". In case a question is generated by the NLP model or the generative AI model, the set of predefined rules may be determined in conjunction with the first AI model (for example, same or different generative AI model).

Further, the AI engine 501 may assign a weightage to each of the generated questions of the questionnaire in such a way that the more relevant question may be assigned more weightages. The AI engine 501 may use the second AI model (e.g., a RNN or a Fast-RNN) for this step. The questionnaire may also include questions that may have the same weightages. In an embodiment, the question "Scripting language and tool used to automate the test case" may have more weightage than the question "capital required to automate a test case", as a change in the user response corresponding to the question "scripting language and tool used to automate the test case" may also change the user response corresponding to the question "capital required to automate a test case". Thus, the question "scripting language and tool used to automate the test case" may be more relevant and thus may have more weightage in determining whether to automate the test case.

In an embodiment, the second AI model may make the first computation of weightage of an NLP or a generative AI-generated question at a first time instance t1. Further, the second AI model may be trained and finetuned (i.e., modification of one or more parameters of the second AI mode) at a second time instance t2 (where t2>t1). This may be done to increase accuracy and relevancy of predictions of weightages by the second AI model. Additionally, the second AI model may dynamically update a weightage of an NLP or a generative AI-generated question after one or more computations based on the historical data of the test case.

In some embodiments, the AI engine 501 may further include a third AI model. The third AI model may be an LLM that may receive user responses in natural language (through voice input, text input, image input, or video input). Further, the third AI model may process and transform the received user responses into numerical values within a common scale for ease of computation of test automation feasibility indices by the computation engine 206.

It should be noted that all such aforementioned engines 204-207 and 501 may be represented as a single module or a combination of different modules. Further, as will be appreciated by those skilled in the art, each of the engines 204-207 and 501 may reside, in whole or in parts, on one device or multiple devices in communication with each other. In some embodiments, each of the engines 204-207 and 501 may be implemented as dedicated hardware circuit comprising custom application-specific integrated circuit (ASIC) or gate arrays, off-the-shelf semiconductors such as logic chips, transistors, or other discrete components. Each of the engines 204-207 and 501 may also be implemented in a programmable hardware device such as a field programmable gate array (FPGA), programmable array logic, programmable logic device, and so forth. Alternatively, each of the engines 204-207 and 501 may be implemented in software for execution by various types of processors (e.g., the processing circuitry 201). An identified module of executable code may, for instance, include one or more physical or logical blocks of computer instructions, which may, for instance, be organized as an object, procedure, function, or other construct. Nevertheless, the executables of an identified module or component need not be physically located together, but may include disparate instructions stored in different locations which, when joined logically together, include the module, and achieve the stated purpose of the module. Indeed, a module of executable code could be a single instruction, or many instructions, and may even be distributed over several different code segments, among different applications, and across several memory devices.

Figure 6:
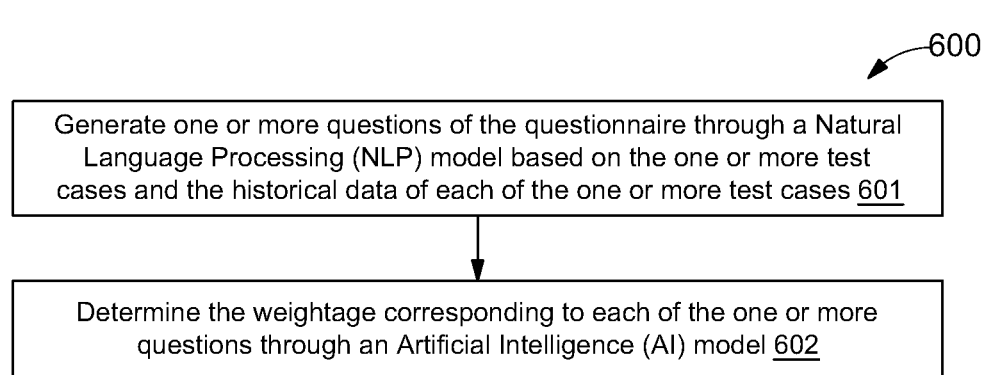
FIG. 6 is a flow diagram of an exemplary process for generation of questions and determination of corresponding weightages, in accordance with an exemplary embodiment of the present disclosure.

FIG. 6 is a flow diagram that illustrates an exemplary process 500 for generation of questions and determination of corresponding weightages, in accordance with an exemplary embodiment of the present disclosure. FIG. 6 is explained in conjunction with elements from FIGS. 1, 2, 3, 4, and 5. In an embodiment, the process 600 may be implemented by the computing device 101. The process 600 may include generating, by the AI engine 501, one or more questions of the questionnaire through a generative AI model based on the test case and the historical data of the test case, at step 601. The historical data may be retrieved from the database 204. Further, the process 600 may include determining, by the AI engine 501, the weightage corresponding to each of the one or more questions through an AI model (such as the second AI model), at step 602. Further, upon execution of the process 600, execution of the process 300 or the process 400 may be initiated as was done for predefined questions.

Figure 7:
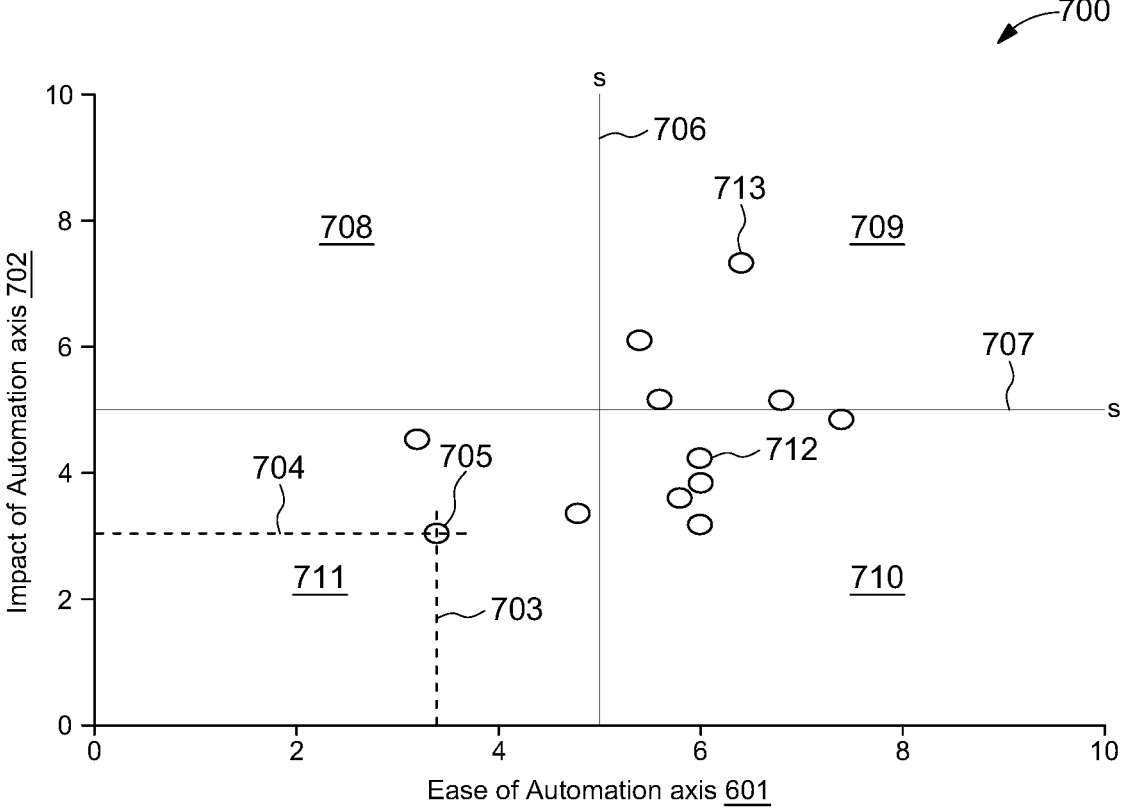
FIG. 7 is a chart representing test automation feasibility indices of a plurality of test cases, in accordance with an exemplary embodiment of the present disclosure.

FIG. 7 is a diagram that illustrates an exemplary graph 700 for determination of feasibility of test automation, in accordance with an exemplary embodiment of the present disclosure. FIG. 7 is explained in conjunction with elements from FIGS. 1, 2, 3, 4, 5, and 6. In an embodiment, the graph 700 may be generated by the computing device 101 and visualized on the GUI 211 of the user device 102. The graph 700 may include an x-axis corresponding to the ease of automation axis 701, and a y-axis corresponding to the impact of automation axis 702.

Further, the ease of automation axis 701 and impact of automation axis 702 may have a scale of 0 to 10. The graph 700 may be generated in such a way that it may accommodate the transformed numerical values corresponding to the ease of automation index and the impact of automation index.

Further, the graph 700 may represent a test case as a point 705 based on the corresponding numerical values of the ease of automation index and the impact of automation index. By way of an example, for a test case, the computation engine 206 may compute the ease of automation index corresponding to the first set of questions (i.e., ease of automation questionnaire) as "3.5" and may compute the impact of automation index corresponding to the second set of questions (i.e., impact of automation questionnaire) as "3". Further, the rendering engine 207 may receive the computed ease of automation index and impact of automation index. The rendering engine 207 may represent a first perpendicular line 703 from the point "3.5" on the ease of automation axis 701 and a second perpendicular line 704 from the point "3" on the impact of automation axis 702 on the graph 700. Further, an intersection point 705 of the first perpendicular line 703 and the second perpendicular line 704 may indicate the feasibility of the automation of the test case.

In an embodiment, the graph 700 may be divided into four quadrants by perpendicularly extending a first line 706 from the mid-point of the x-axis corresponding to the ease of automation axis 701 and perpendicularly extending a second line 707 from the mid-point of the y-axis corresponding to the impact of automation axis 702. The intersection of the first line 706 and the second line 707 may divide the graph 700 into four quadrants such as, a first quadrant 709, a second quadrant 708, a third quadrant 711, and a fourth quadrant 710.

In an embodiment, a point 713 falling in the first quadrant 709 may indicate that the test case may have high impact of automation and may be easy to automate. Thus, the ROI on the automation of the test case may be high. In fact, the test cases falling in the first quadrant 709 may be most feasible to automate. A point falling in the second quadrant 708 may indicate that the test case may have high impact of automation but may not be easy to automate. Thus, a ROI on the automation of the test case may be low. The point 705 falling in the third quadrant 711 may indicate that the test case may have low impact of automation and may not be easy to automate. Thus, the ROI on the automation of the test case may be worst. A point 712 falling in the fourth quadrant 710 may indicate that the test case may have low impact of automation but may be easy to automate. Thus, the ROI on the automation of the test case may be low. Further, the points falling in different quadrants may be color coded to better visualize the graph 700.

Figure 8:
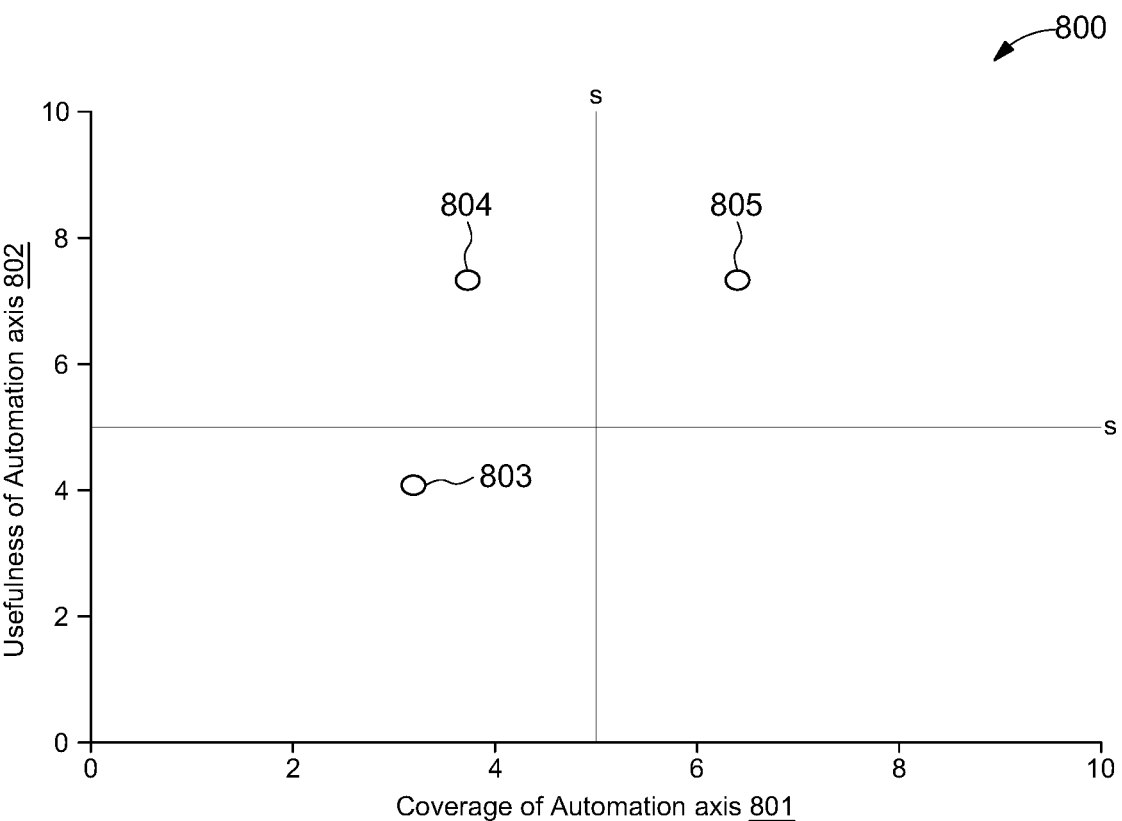
FIG. 8 is a graph representing test automation maturity indices of a plurality of test cases, in accordance with an exemplary embodiment of the present disclosure.

FIG. 8 is a diagram that illustrates an exemplary graph 800 representing test automation maturity indices of a plurality of test cases, in accordance with an exemplary embodiment of the present disclosure. FIG. 8 is explained in conjunction with elements from FIGS. 1, 2, 3, 4, 5, 6, and 7. In an embodiment, the graph 800 may be generated by the computing device 101 and visualized on the GUI 211 of the user device 102. The graph 800 may include an x-axis corresponding to a coverage of automation axis 801, and a y-axis corresponding to the usefulness of automation axis 802.

Further, the coverage of automation axis 801 and the usefulness of automation axis 802 may have a scale of 0 to 10. The graph 800 may be generated in such a way that it may represent the transformed numerical values corresponding to the automation maturity indices (i.e., the coverage of automation index and the usefulness of automation index). For example, the graph 800 may represent the automation maturity indices of three test cases as points 803, 804, and 805.

By way of an example, for a test case, the computation engine 206 may compute the coverage of automation index corresponding to the first set of questions (i.e., coverage of automation questionnaire) as "6.5" and may compute the usefulness of automation index corresponding to the second set of questions (i.e., usefulness of automation questionnaire) as "7.5". Further, the rendering engine 207 may receive the computed coverage of automation index and usefulness of automation index. The rendering engine 207 may represent the test case on the graph 800 as the point 805.

In an embodiment, the graph 800 may be divided into four quadrants, i.e., a first quadrant, a second quadrant, a third quadrant, and a fourth quadrant.

The point 805 may lie in the first quadrant indicating that the associated test case may have a high usefulness of automation and is currently highly automated. Thus, the maturity percentage of the automation of the test case may be high. In fact, the test cases falling in the first quadrant may be most mature with respect to automation. Additional automation of such test cases (for example, automation of one or more test steps that are currently not automated) may be desirable. A point falling in the second quadrant (e.g., the point 804) may indicate that the test case may have high usefulness of automation but may not have been automated to a desirable extent. Thus, current amount of automation of the test case (for example, the number of test steps currently automated in the test case) may be low and more automation (for example, automation of one or more test steps that are currently not automated) may be desirable. A point falling in the third quadrant (e.g., the point 803) may indicate that the test case may have low usefulness of automation and may not have been highly automated. Thus, the current amount of automation of the test case may be low and additional automation may not be desirable. A point falling in the fourth quadrant may indicate that the test case may have low usefulness of automation but may be currently highly automated. Thus, the current amount of automation of the test case may be high and additional automation may not be desirable. Further, the points falling in different quadrants may be color coded to better visualize the graph 800.

As will be also appreciated, the above-described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention.

The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 9:
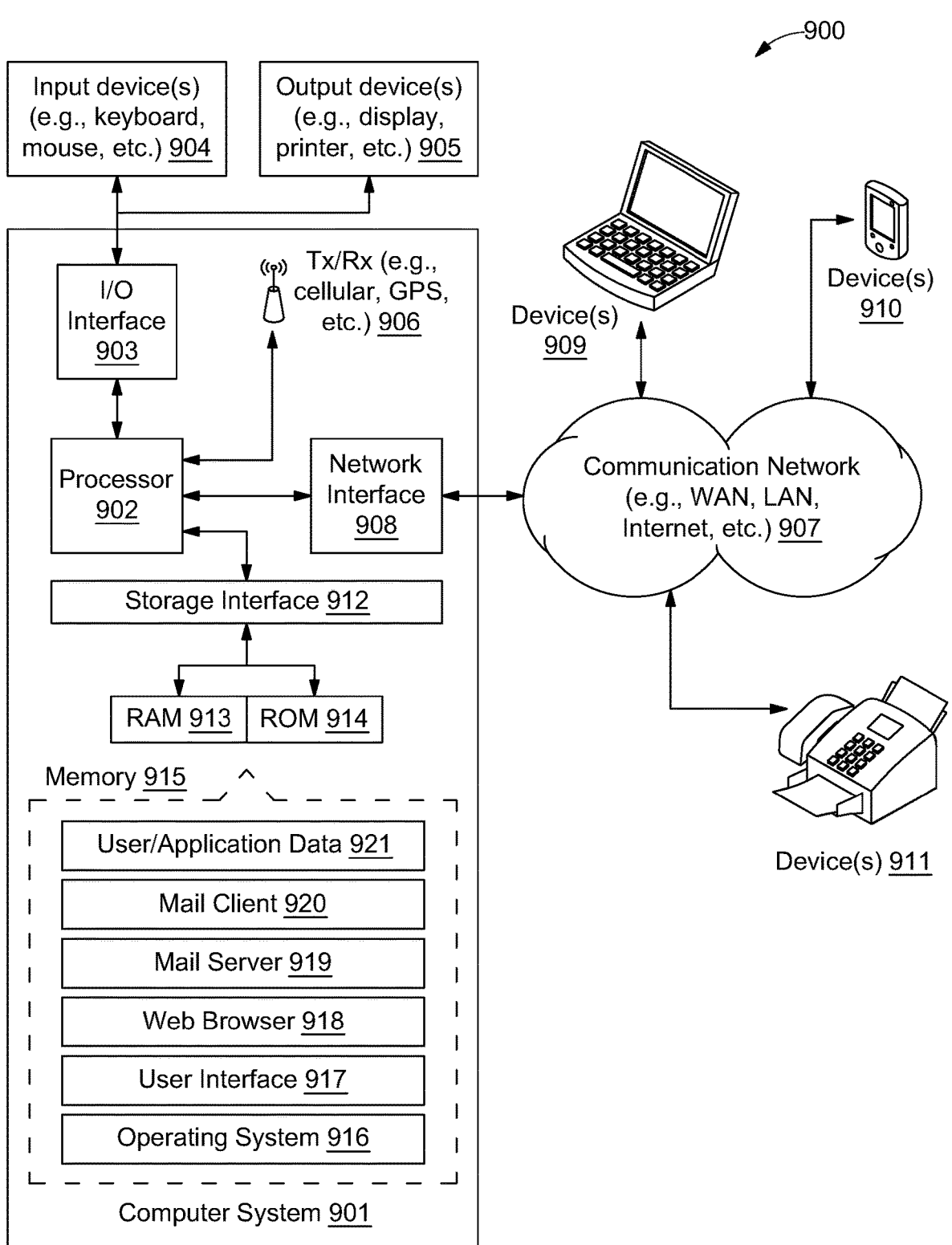
FIG. 9 is a block diagram of a system architecture of a computer system for calculation of test automation feasibility indices and test automation maturity indices, in accordance with an exemplary embodiment of the present disclosure.

The disclosed methods and systems may be implemented on a conventional or a general-purpose computer system, such as a personal computer (PC) or server computer. FIG. 9 is a block diagram that illustrates a system architecture 900 of a computer system 901 for calculation of test automation feasibility indices and test automation maturity indices, in accordance with an exemplary embodiment of the present disclosure. Variations of computer system 901 may be used for implementing computing device 101 for calculation of test automation feasibility indices and test automation maturity indices. Computer system 901 may include a central processing unit ("CPU" or "processor") 902. Processor 902 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD® ATHLON®, DURON® OR OPTERON®, ARM's application, embedded or secure processors, IBM® POWERPC®, INTEL® CORE® processor, ITANIUM® processor, XEON® processor, CELERON® processor or other line of processors, etc. The processor 902 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FP-GAs), etc.

Processor 902 may be disposed in communication with one or more input/output (I/O) devices via I/O interface 903. The I/O interface 903 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMAX, or the like), etc.

Using the I/O interface 903, the computer system 901 may communicate with one or more I/O devices. For example, the input device 904 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 905 may be a printer, fax machine, video display (e.g., cathode ray tube (CRT), liquid crystal display (LCD), light-emitting diode (LED), plasma, or the like), audio speaker, etc. In some embodiments, a transceiver 906 may be disposed in connection with the processor 902. The transceiver 906 may facilitate various types of wireless transmission or reception. For example, the transceiver 906 may include an antenna operatively connected to a transceiver chip (e.g., TEXAS INSTRUMENTS® WILINK WL1286®, BROADCOM BCM4550IUB8®, INFINEON TECHNOLOGIES® X-GOLD 1436-PMB9800® transceiver, or the like), providing IEEE 802.11a/b/g/n, Bluetooth, FM, global positioning system (GPS), 2G/3G HSDPA/HSUPA communications, etc.

In some embodiments, the processor 902 may be disposed in communication with a communication network 907 via a network interface 908. The network interface 908 may communicate with the communication network 907. The network interface 908 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 907 may include, without limitation, a direct interconnection, local area network (LAN), wide area network (WAN), wireless network (e.g., using Wireless Application Protocol), the Internet, etc. Using the network interface 908 and the communication network 907, the computer system 901 may communicate with devices 905, 909, 910, and 911. These devices may include, without limitation, personal computer(s), server(s), fax machines, printers, scanners, various mobile devices such as cellular telephones, smartphones (e.g., APPLE® IPHONE®, BLACKBERRY® smartphone, ANDROID® based phones, etc.), tablet computers, eBook readers (AMAZON® KINDLE®, NOOK® etc.), laptop computers, notebooks, gaming consoles (MICROSOFT® XBOX®, NINTENDO® DS®, SONY® PLAYSTATION®, etc.), or the like. In some embodiments, the computer system 901 may itself embody one or more of these devices.

In some embodiments, the processor 902 may be disposed in communication with one or more memory devices 915 (e.g., RAM 913, ROM 914, etc.) via a storage interface 912. The storage interface 912 may connect to memory devices 915 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices 915 may store a collection of program or database components, including, without limitation, an operating system 916, user interface 917, web browser 918, mail server 919, mail client 920, user/application data 921 (e.g., any data variables or data records discussed in this disclosure), etc. The operating system 916 may facilitate resource management and operation of the computer system 901. Examples of operating systems include, without limitation, APPLE® MACINTOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBM® OS/2, MICROSOFT® WINDOWS® (XP®, Vista R/7/8/10/11, etc.), APPLE® IOS®, GOOGLE® ANDROID®, BLACK-BERRY® OS, or the like. User interface 917 may facilitate display, execution, interaction, manipulation, or operation of program components through textual or graphical facilities. For example, user interfaces may provide computer inter-action interface elements on a display system operatively connected to the computer system 901, such as cursors, icons, check boxes, menus, scrollers, windows, widgets, etc. Graphical user interfaces (GUIs) may be employed, includ-ing, without limitation, APPLE® MACINTOSH® operating systems' AQUA® platform, IBM® OS/2®, MICROSOFT® WINDOWS® (e.g., AERO®, METRO®, etc.), UNIX X-WINDOWS, web interface libraries (e.g., ACTIVEX®, JAVA®, JAVASCRIPT®, AJAX®, HTML, ADOBE® FLASH®, etc.), or the like.

In some embodiments, the computer system 901 may implement a web browser 918 stored program component. The web browser 918 may be a hypertext viewing applica-tion, such as MICROSOFT® INTERNET EXPLORER®, GOOGLE® CHROME®, MOZILLA FIREFOX®, APPLE® SAFARI®, etc. Secure web browsing may be provided using HTTPS (secure hypertext transport proto-col), secure sockets layer (SSL), Transport Layer Security (TLS), etc. Web browsers may utilize facilities such as AJAX®, DHTML, ADOBE® FLASH®, JAVASCRIPT®, JAVA®, application programming interfaces (APIs), etc. In some embodiments, the computer system 901 may imple-ment a mail server 919 stored program component. The mail server 919 may be an Internet mail server such as MICROSOFT® EXCHANGE®, or the like. The mail server 919 may utilize facilities such as ASP, ActiveX, ANSI C++/C#, MICROSOFT .NET® CGI scripts, JAVA®, JAVASCRIPT®, PERL®, PHP®. PYTHON®, WebObjects, etc. The mail server 1119 may utilize communication pro-tocols such as internet message access protocol (IMAP), messaging application programming interface (MAPI), MICROSOFT® EXCHANGE®, post office protocol (POP), simple mail transfer protocol (SMTP), or the like. In some embodiments, the computer system 901 may implement a mail client 920 stored program component. The mail client 920 may be a mail viewing application, such as APPLE MAIL®, MICROSOFT ENTOURAGE®, MICROSOFT OUTLOOK®, MOZILLA THUNDERBIRD®, etc.

In some embodiments, computer system 901 may store user/application data 921, such as the data, variables, records, etc. (e.g., the set of predictive models, the plurality of clusters, set of parameters (batch size, number of epochs, learning rate, momentum, etc.), accuracy scores, competi-tiveness scores, ranks, associated categories, rewards, threshold scores, threshold time, and so forth) as described in this disclosure. Such databases may be implemented as fault-tolerant, relational, scalable, secure databases such as ORACLE® OR SYBASE® OR POSTGRESQL® OR any such similar data. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclo-sure. It is to be understood that the structure and operation of the any computer or database component may be com-bined, consolidated, or distributed in any working combi-nation.

Thus, the disclosed method and system try to overcome the technical problem of determining the feasibility and maturity of the automation of the network test cases. Clas-sical or traditional approaches for determining the maturity of the automation of the test cases struggle with manual labor costs, resources consumed and the human error in determining the maturity of the automation of the test cases. The disclosed method and system generate a questionnaire corresponding to the coverage of automation of a test case and the usefulness of automation of a test case. Further, the method and system assign a weightage to each question of the questionnaire. Further, the method and system receive input data including user responses to a questionnaire asso-ciated with the test case. Further, the method and system transform each of the user responses into a numerical value within a common scale ranging from 0 to 10. Further, the method and system generate a chart representing the test case on a first GUI based on the coverage of automation index and the usefulness of automation index.

As will be appreciated by those skilled in the art, the techniques described in the various embodiments discussed above are not routine, or conventional, or well understood in the art. The techniques discussed above provide for deter-mination of maturity of automation of the test cases. The techniques generate or select a set of questions to form a questionnaire corresponding to the coverage of automation of the test case and the usefulness of automation of the test case. AI models are used to generate a set of questions. The idea is that a user may provide a user input to the question-naire generated and based on the user input, a maturity is determined and visualized on a GUI. The user input pro-vided by the user is further transformed into a numerical value on a scale of 0 to 10. The transformed numerical values corresponding to each of the question of the ques-tionnaire are further transformed into a single numerical value corresponding to a coverage of automation index and a single numerical value corresponding to a usefulness of automation index based on the weightages assigned to each of the question of the questionnaire. The techniques further generate a chart using the coverage of automation index and the usefulness of automation index. The generated chart is used to further interpret the maturity of the automation of the test case.

In light of the above-mentioned advantages and the tech-nical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described method and system for determination of feasibility and maturity of network test automation. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relation-ships thereof are appropriately performed. Alternatives (in-cluding equivalents, extensions, variations, deviations, etc., of those described herein) will be apparent to persons skilled in the art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for determination of maturity of test automation, the method comprising:

receiving, by a computing device, input data comprising user responses to a questionnaire associated with a test case, wherein the questionnaire comprises a first set of questions associated with a coverage of test case automation, and a second set of questions associated with a usefulness of test case automation;

determining, by the computing device, a first set of weightages corresponding to the first set of questions and a second set of weightages corresponding to the second set of questions using an Artificial Intelligence (AI) model, wherein the determining comprises of:

dynamically updating the first set of weightages and the second set of weightages based on historical data of the test case, wherein the historical data comprises data corresponding to the first set of questions, the second set of questions, and previous weightages associated with each of the first set of questions and the second set of questions;

computing, by the computing device, a coverage of automation index based on the user responses and the first set of weightages corresponding to the first set of questions, and a usefulness of automation index based on the user responses and the second set of weightages corresponding to the second set of questions;

generating, by the computing device, a recommendation corresponding to automation of the test case based on the coverage of automation index and the usefulness of automation index;

transforming each of the user responses into a numerical value within a common scale based on a set of predefined rules;

generating a chart representing the test case on a first Graphical User Interface (GUI) based on the coverage of automation index and the usefulness of automation index, wherein:

the chart comprises an x-axis representing values of the coverage of automation index and a y-axis representing values of the usefulness of automation index, the chart comprises four quadrants formed by extending a perpendicular line from a mid-point of the common scale of each of the x-axis and the y-axis, and the test case is represented in a quadrant of the four quadrants; and assigning a category from a set of categories to the test case based on the quadrant associated with the test case, wherein each of the set of categories corresponds to an automation feasibility label.

2. The method of claim 1, wherein the input data further comprises the historical data of the test case.

3. The method of claim 2, further comprising generating, by the computing device, one or more questions of the questionnaire through a generative Artificial Intelligence (AI) model based on the test case and the historical data of the test case.

4. The method of claim 1, further comprising assigning, by the computing device, a category from a set of categories to the test case based on the quadrant associated with the test case, wherein each of the set of categories further corresponds to an automation maturity label.

5. The method of claim 1, further comprising rendering, by the computing device and through a second GUI, the generated recommendation.

6. The method of claim 1, further comprising determining, by the computing device, an automation maturity percentage of the test case based on the coverage of automation index and the usefulness of automation index.

7. The method of claim 1, further comprising rendering, by the computing device and through a third GUI, a review of current automation of the test case based on the coverage of automation index and the usefulness of automation index.

8. A system for determination of maturity of test automation, the system comprising:

a processing circuitry; and a memory communicatively coupled to the processing circuitry, wherein the memory stores processor instructions, which when executed by the processing circuitry, cause the processing circuitry to:

receive input data comprising user responses to a questionnaire associated with a test case, wherein the questionnaire comprises a first set of questions associated with a coverage of test case automation, and a second set of questions associated with a usefulness of test case automation;

determine a first set of weightages corresponding to the first set of questions and a second set of weightages corresponding to the second set of questions using an Artificial Intelligence (AI) model, and wherein to determine the first set of weightages and the second set of weightages, the processing circuitry is further caused to:

dynamically update the first set of weightages and the second set of weightages based on historical data of the test case, wherein the historical data comprises data corresponding to the first set of questions, the second set of questions, and previous weightages associated with each of the first set of questions and the second set of questions;

compute a coverage of automation index based on the user responses and the first set of weightages corresponding to the first set of questions, and a usefulness of automation index based on the user responses and the second set of weightages corresponding to the second set of questions;

generate a recommendation corresponding to automation of the test case based on the coverage of automation index and the usefulness of automation index;

transform each of the user responses into a numerical value within a common scale based on a set of pre-defined rules;

generate a chart representing the test case on a first Graphical User Interface (GUI) based on the coverage of automation index and the usefulness of automation index, wherein:

the chart comprises an x-axis representing values of the coverage of automation index and a y-axis representing values of the usefulness of automation index, the chart comprises four quadrants formed by extending a perpendicular line from a mid-point of the common scale of each of the x-axis and the y-axis, and the test case is represented in a quadrant of the four quadrants; and assign a category from a set of categories to the test case based on the quadrant associated with the test case, wherein each of the set of categories corresponds to an automation feasibility label.

9. The system of claim 8, wherein the input data further comprises the historical data of the test case.

10. The system of claim 9, wherein the processor instructions, on execution, further cause the processing circuitry to generate one or more questions of the questionnaire through a generative Artificial Intelligence (AI) model based on the test case and the historical data of the test case.

11. The system of claim 8, wherein the processor instructions, on execution, further cause the processing circuitry to render, through a second GUI, the generated recommendation.

12. The system of claim 8, wherein the processor instructions, on execution, further cause the processing circuitry to determine a target automation percentage of the test case based on the coverage of automation index and the usefulness of automation index.

13. The system of claim 8, wherein the processor instructions, on execution, further cause the processing circuitry to render, through a third GUI, a review of current automation of the test case based on the coverage of automation index and the usefulness of automation index.

* * * * *